Patented Aug. 23, 1932

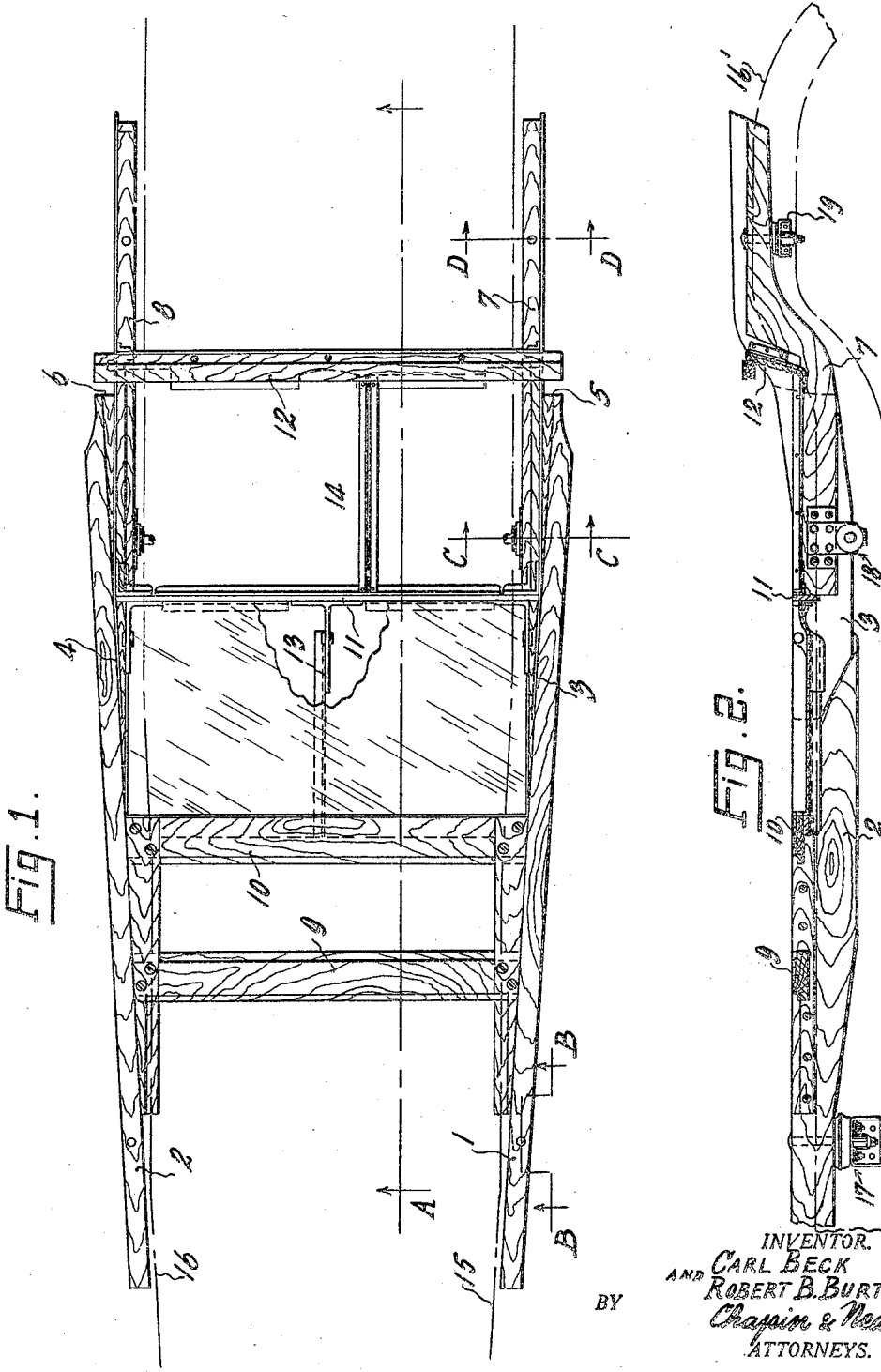

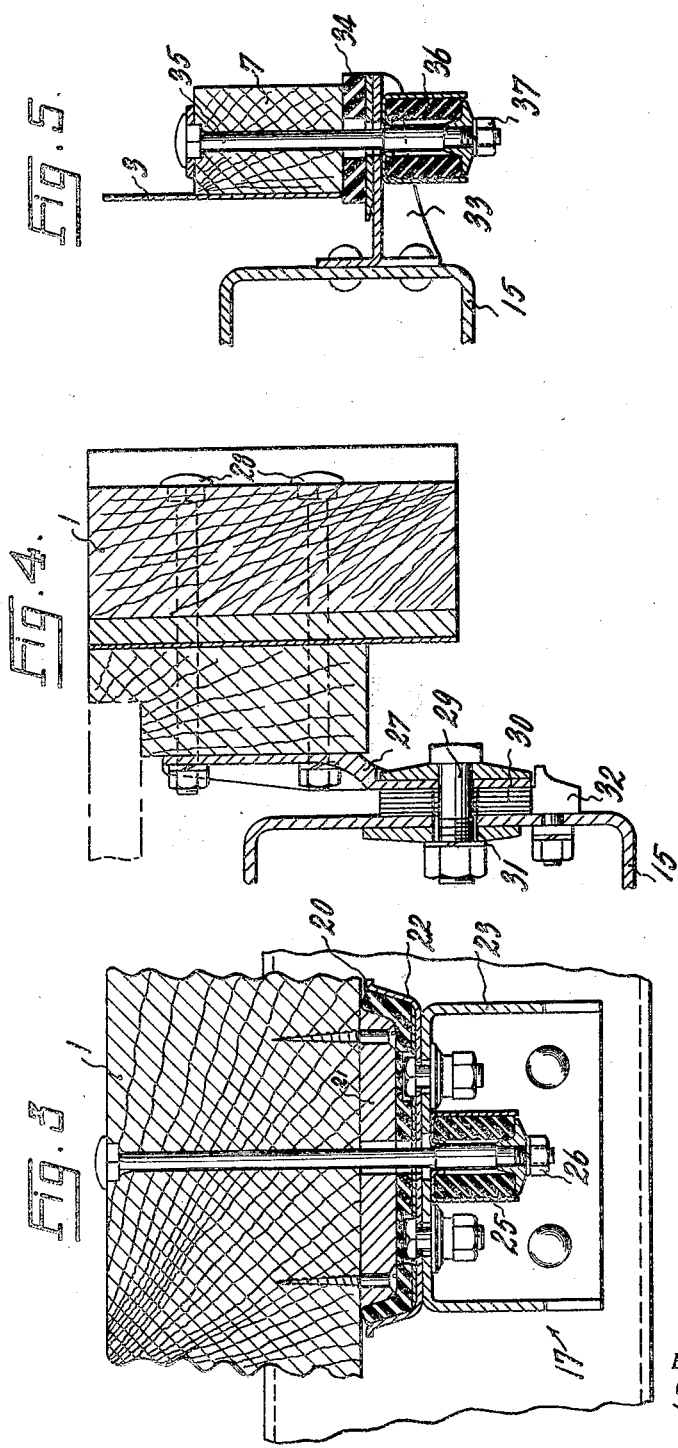

1,872,671

UNITED STATES PATENT OFFICE

CARL BECK, OF SPRINGFIELD, AND ROBERT B. BURTON, OF LONGMEADOW, MASSA-CHUSETTS, ASSIGNORS TO ROLLS ROYCE OF AMERICA, INC., OF SPRINGFIELD, MASSACHUSETTS, A CORPORATION OF DELAWARE

SUBFRAME FOR AUTOMOBILE BODIES

Application filed June 11, 1931. Serial No. 543,582.

This invention relates to a subframe for automobile bodies adapted for being detachably secured to the main chassis frame of an automobile.

It is well known that an automobile for good roadability, particularly at high speeds, should have a chassis frame which is somewhat flexible and not too rigid. When the body of the automobile is built directly upon such a chassis frame, the flexing of the latter transmits racking strains to the body tending to pull it apart. For this reason subframes for the body have come into use, which subframes are made relatively rigid and serve as a base upon which the body is built, the subframe being adapted for suspension upon the chassis frame at spaced points of attachment. Heretofore the subframe has been usually fabricated of metal with steel channel side bars throughout the length of the frame. An example of such a type of subframe is shown in British Patent 247,689, Sept. 8, 1925.

The present invention aims more particularly at the improvement over such metal subframes by constructing the same largely of wood with the employment of metal therein only to a limited extent and of such design as to utilize to the best advantage the merits of wood and steel for such a subframe. A further feature of the invention resides in the means for suspending the subframe upon the chassis frame and more particularly in the location of the points of attachment between the two frames so as to reduce the deflection of the side beams of the subframe in direct vertical bending to a minimum for any given cross section of the same.

Further objects and advantages of the invention will become apparent from the following specification taken in connection with the accompanying drawings, wherein:

Fig. 1 is a plan view of the subframe;

Fig. 2 is a longitudinal central section through line A—A of Fig. 1 showing in side elevation the inner face of one of the side members of the subframe;

Fig. 3 is an enlarged detail section of the front attaching support of the subframe through line B—B of Fig. 1;

Fig. 4 is a similar enlarged section of the central attachment support through line C—C of Fig. 1;

Fig. 5 is a similar section of the rear attachment support through line D—D of Fig. 1; and Fig. 6 is a side elevation of the subframe showing the modified arrangement of the attachment supports thereof on the chassis frame.

Referring particularly to Fig. 1 of the drawings, the subframe comprises side members or sills 1 and 2 which are straight wooden beams preferably of uniform thickness transversely and extending in a slightly diverging direction from front to rear, as shown. At the rear portion of each side beam and securely fastened on its inner face as a rearward extension thereof are relatively thin metal plates 3 and 4. These metal plates are secured to their respective wooden beams preferably by a large number of wood screws so as to form essentially an integral part and extension of said wooden beams.

As shown in Fig. 1, the metal plates 3 and 4 for the greater part of their length are parallel and to accommodate this parallel disposition of the metal plates to the diverging relation of the wooden side beams, wedge shaped filler pieces of wood 5 and 6 are secured between the outer ends of said side beams 1 and 2 and said plates 3 and 4. The plates 3 and 4 are identical in shape and each is formed with an upward offset which begins approximately at the rear end of the wooden beams so as to form the upsweep for the rear portion of the subframe, which is so designed for overlying the rear axle of the automobile.

Firmly fastened upon the inner side of each plate 3 and 4 are wooden shelf pieces 7 and 8 which extend forwardly in overlapping relation with the rear end of the side beams 1 and 2 and rearwardly to approximately the rear ends of said plates 3 and 4. The shelf pieces 7 and 8, as shown in Fig. 2, are shaped to conform at their lower rear portion with the lower edge of their adjacent plates 3 and 4 and have a shorter vertical dimension than said plates so as to form an inside step or shelf with said plates which will serve as the resting support for the rear seat of the automobile.

The subframe further comprises a suitable number of cross members firmly fastened at each end to the side members for bracing the frame transversely. In the present embodiment, the said cross members are indicated at 9, 10, 11 and 12 and it will be understood that said cross members may be suitably designed to support the floor boards of the automobile body. In some cases it may be desirable also to provide longitudinal tie rods such as 13 and 14 between certain of the cross members for additional bracing.

The advantages which flow from the use of wooden side beams in place of steel channel bars for the subframe are that a cheaper and lighter construction may be obtained for the same strength and that the building of the body upon such a wooden base is simplified and made less expensive. The termination of the wooden side beams just short of where the upsweep of the frame begins and the extension of said side beams by means of relatively thin metal plates which are shaped to give the necessary upsweep for the frame avoids any necessity of making the wooden side beams in curved form. Also the relatively small thickness transversely, which is possible in a metal plate while retaining its vertical strength by a large vertical dimension, provides at the rear end of said frame the necessary clearance on the outside for the relative swinging movement of the rear wheel of the automobile, with a minimum sacrifice of space on the inside for the rear seat of said automobile.

In order to obtain the full advantage of the rigid subframe in isolating the body of the automobile from the distortion of the more flexible chassis frame, it is desirable to suspend the subframe on the chassis at only a few points of attachment and the supports at these points of attachment should preferably be elastic or slightly yielding in character so as to reduce as far as possible strains and stresses being transmitted to the body from the distortions of the more flexible chassis frame. In one embodiment of the present invention, as shown in Figs. 1 and 2, three points of attaching support are provided between the subframe and chassis frame at each side thereof. In Fig. 1 the outer sides of the chassis frame are indicated by the dotted lines 15 and 16, and in Fig. 2 an outline in elevation of the side bar of said chassis frame is indicated in dotted lines 16.

Referring to Fig. 2, the front supporting attachment for the subframe at one side thereof is indicated at 17, the central supporting attachment at 18, and the rear supporting attachment at 19. The central attaching support 18 is approximately opposite the center of gravity of the frame, the forward support 17 is preferably slightly to the rear of the front end of said frame, and the rear support 19 slightly to the rear of the rear end of said frame. This arrangement of the supports is for the purpose of reducing the amount of possible deflection vertically of the side members of the subframe at any given point.

In the modification shown in Fig. 6, the front support 17 is located as previously described in connection with Fig. 2; but the rear support 19' is located somewhat farther forward on the frame than is shown in Fig. 2 and preferably just in front of where the rear upsweep of the frame begins. This location of the rear support makes possible the elimination of a central support such as 18, and as shown in this modification each side of the subframe is attached to the chassis frame by only two points of support 17 and 19, which arrangement provides a greater degree of isolation of the body from the distortions of the chassis frame than is provided in the form of construction shown in Fig. 2.

The detailed construction of the several attaching supports previously mentioned is shown clearly in Figs. 3, 4 and 5. The front support in Fig. 3 comprises a cup shaped piece of rubber 20 imprisoned between a tapered block 21 fastened to the side beam 1 and a metal cup 22 secured on a bracket 23 which is fastened to the chassis frame 15. The subframe is yieldingly held to this chassis frame by means of the bolt 24, rubber washer 25 and nut 26.

The central support shown in Fig. 4 comprises a metal bracket 27 secured by bolts 28 to the side beam 1, which bracket carries on its depending portion a fastening bolt 29 passing through the same and the side of said chassis member 15. Spacing washers 30 are provided between the bracket 27 and said chassis member, and the aperture 31 for said washers and chassis member is preferably of larger diameter than the bolt 29 to provide sufficient freedom for this connection. 32 is a metal ledge fastened to the chassis member 15 and located as shown to limit the movement of this central support against the friction of the washers and to assist in assembly until the main bolt 29 is tightened up.

The rear support, as shown in Fig. 5, comprises an angle bracket 33 fastened to the chassis member 15, upon which bracket 33 rests the shelf piece 7 and metal plate 3 of the subframe through an interposed rubber washer 34. The parts are held together by means of the bolt 35, rubber washer 36, and nut 37.

It will thus be observed that both the front and rear attaching supports are of resilient character and while acting to firmly secure the parts together permit of a limited amount of play between the same, which play is cushioned by rubber. In this way the chassis frame distortions are transmitted with a minimum amount of strain to the subframe and the body of the automobile.

Claims:

1. A subframe for an automobile body adapted for support upon the chassis of said automobile, said subframe being formed with an upsweep at its rear portion and comprising longitudinally extending wooden side beams terminating adjacent said upsweep portion, each side beam having fastened at its inner side as a rearward extension thereof a relatively thin metal plate shaped with an upward offset to provide the upsweep portion at the rear of said frame, and cross members for bracing said frame.

2. A subframe for an automobile body adapted for support upon the chassis of said automobile, said subframe being formed with an upsweep at its rear portion and comprising longitudinally extending wooden side beams terminating adjacent said upsweep portion, each side beam having fastened at its inner side as a rearward extension thereof a relatively thin metal plate shaped with an upward offset to provide the upsweep portion at the rear of said frame, cross members for bracing said frame, and wooden shelf pieces one fastened on the inner side of each metal plate and extending in overlapped relation with the wooden side beam.

3. A subframe for an automobile body adapted for support upon the chassis of said automobile, said subframe being formed with an upsweep at its rear portion and comprising longitudinally extending wooden side beams diverging from front to rear and terminating adjacent said upsweep portion, each side beam having fastened at its inner side as a rearward extension thereof a relatively thin metal plate shaped with an upward offset to provide the upsweep portion at the rear of said frame, cross members for bracing said frame, and parallel wooden shelf pieces one fastened on the inner side of each metal plate and extending in overlapped relation with the wooden side beam.

4. A subframe for an automobile body adapted for support upon the chassis of said automobile, said subframe being formed with an upsweep at its rear portion and comprising longitudinally extending wooden side beams diverging from front to rear and terminating adjacent said upsweep portion, each side beam having fastened at its inner side as a rearward extension thereof a relatively thin metal plate shaped with an upward offset to provide the upsweep portion at the rear of said frame, cross members for bracing said frame, and parallel wooden shelf pieces one fastened on the inner side of each metal plate and extending in overlapped relation with the wooden side beam, and wedge shaped filler pieces between said diverging side beams and said parallel shelf pieces.

5. A subframe for an automobile body adapted for support upon the chassis of said automobile, said subframe being formed with an upsweep at its rear portion and comprising longitudinally extending wooden side beams terminating adjacent said upsweep portion, each side beam having fastened at its inner side as a rearward extension thereof a relatively thin metal plate shaped with an upward offset to provide the upsweep portion at the rear of said frame, and cross members for bracing said frame, and means for suspending said subframe on said chassis by a two point support at each side thereof comprising front fastening devices at the forward portion of said subframe and rear fastening devices located in front of the upsweep portion of said subframe.

In testimony whereof we have affixed our signatures.

CARL BECK.
ROBT. B. BURTON.